(12) United States Patent
Peterson

(10) Patent No.: US 6,350,060 B1
(45) Date of Patent: Feb. 26, 2002

(54) DUAL LOAD PATH SPHERICAL BEARING AND A METHOD OF COUPLING ALONG A DUAL LOAD PATH

(75) Inventor: Carl L. Peterson, Wichita, KS (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/517,196

(22) Filed: Mar. 2, 2000

(51) Int. Cl.[7] .............................................. F16C 11/06
(52) U.S. Cl. ....................... 384/211; 384/208; 384/209; 403/128; 403/141
(58) Field of Search .................................. 384/192, 206, 384/207, 208, 209, 211, 212; 403/128, 131, 141

(56) References Cited

U.S. PATENT DOCUMENTS

| | | | | |
|---|---|---|---|---|
| 2,795,465 A | * | 6/1957 | Dwyer ........................ 384/209 |
| 2,827,340 A | * | 3/1958 | Johnson ...................... 384/209 |
| 2,886,379 A | * | 5/1959 | Small ......................... 384/207 |
| 3,746,408 A | * | 7/1973 | Wachter et al. ............. 384/207 |
| 3,759,589 A | * | 9/1973 | Rozentals ................... 384/207 |
| 4,678,350 A | * | 7/1987 | Statz ......................... 384/208 |
| 5,484,211 A | * | 1/1996 | Uthoff ........................ 384/192 |

* cited by examiner

Primary Examiner—Thomas R. Hannon
(74) Attorney, Agent, or Firm—Baker Botts L.L.P.

(57) ABSTRACT

A dual load path spherical bearing (10) comprises a bearing race (12) and a bearing ball (14). The bearing race (12) comprises a bearing race first half (16) and a bearing race second half (22) adapted to interface with the bearing race first half to form a bearing ball cage. The bearing ball (14) is rotatably caged in the bearing ball cage. The bearing ball (14) comprises a bearing ball first half (30), and a bearing ball second half (32) adapted to interface with the bearing ball first half. The bearing race (12) further comprises a bearing race first half (16) having a coupling shaft with an internally and externally threaded half shaft, and a bearing race second half (22) adapted to interface with the bearing race first half (16) to form a bearing ball cage and having a coupling shaft with an internally and externally threaded half shaft.

23 Claims, 5 Drawing Sheets

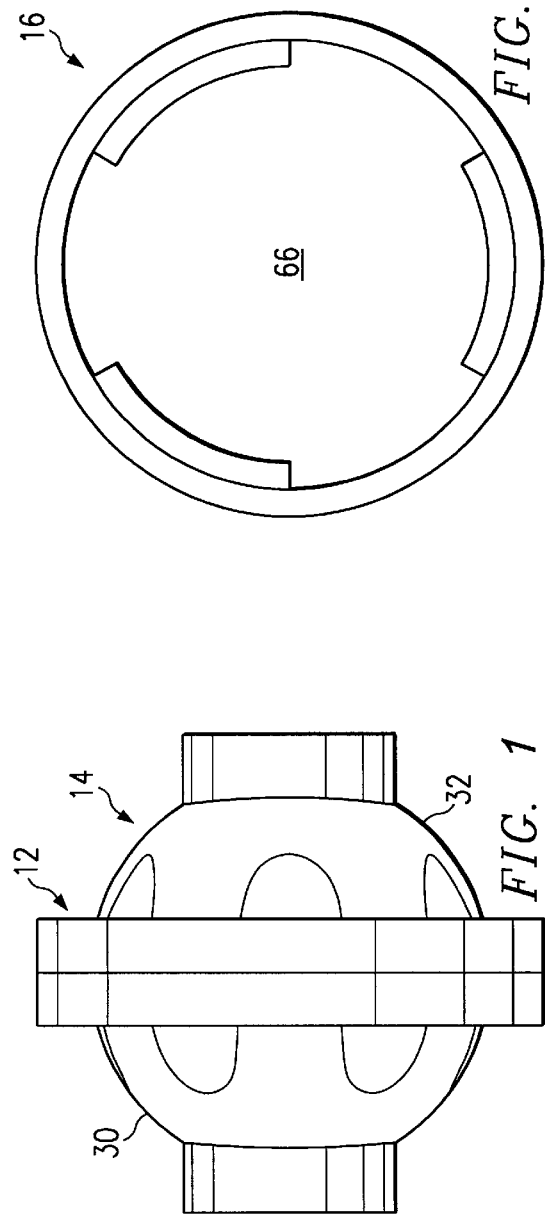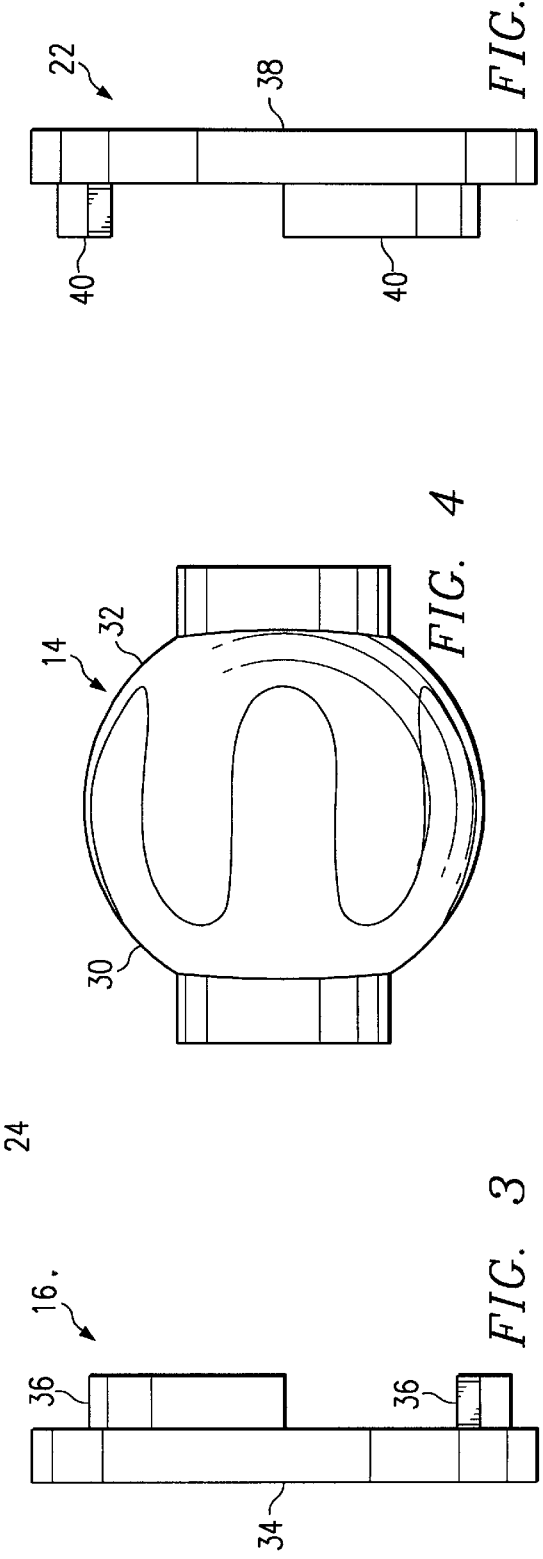

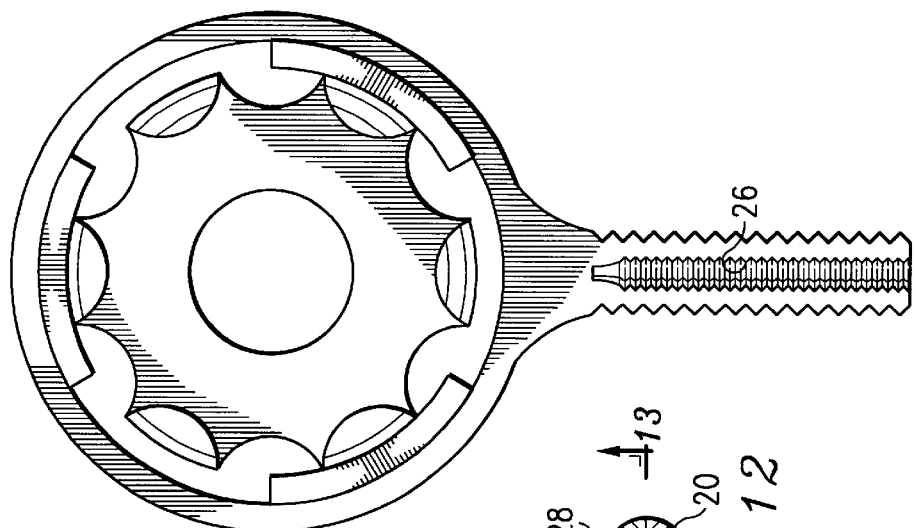
FIG. 13
FIG. 12
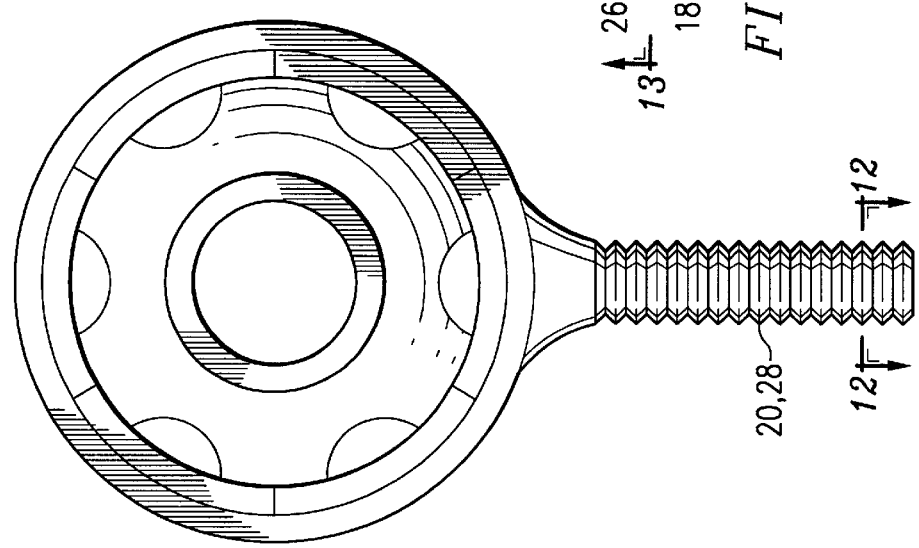
FIG. 11
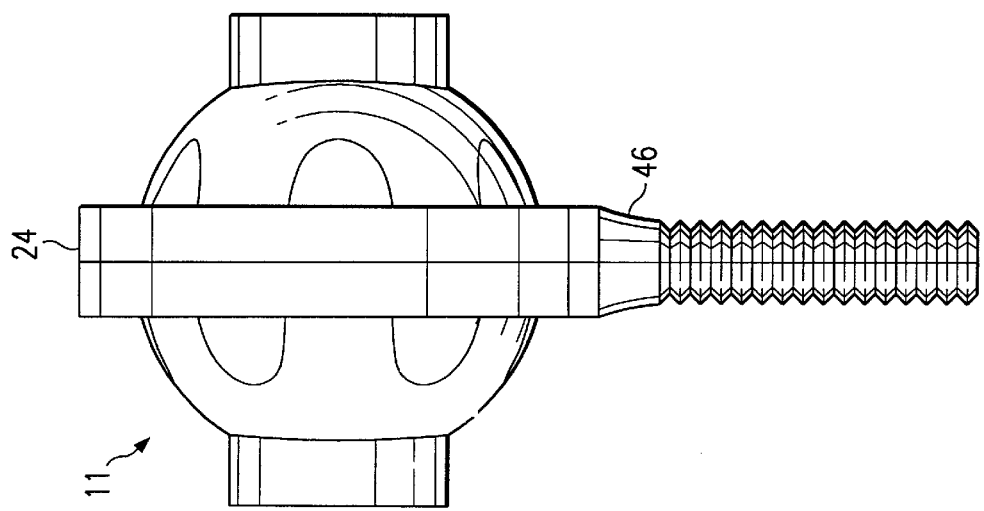
FIG. 10

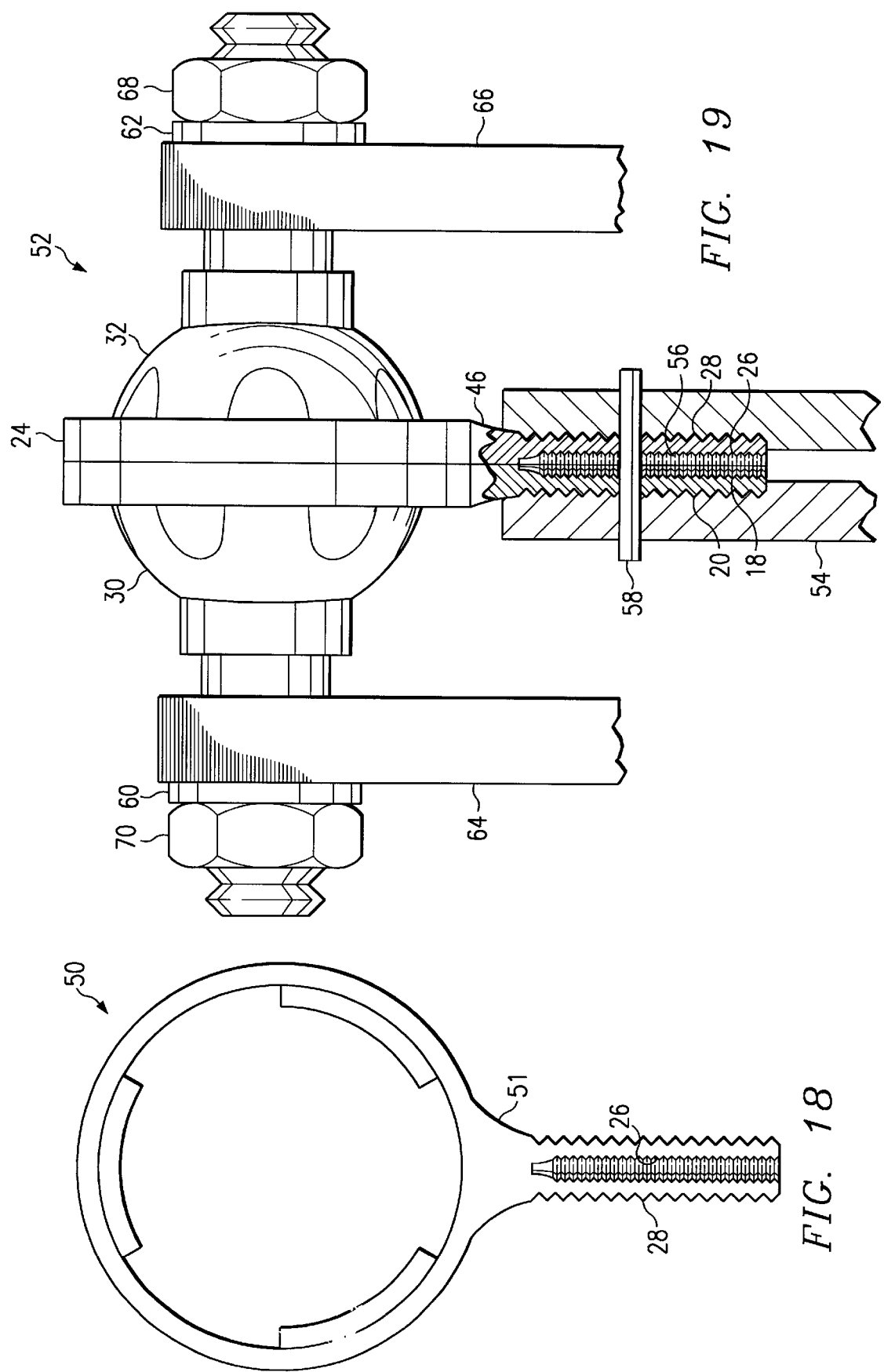

DUAL LOAD PATH SPHERICAL BEARING AND A METHOD OF COUPLING ALONG A DUAL LOAD PATH

TECHNICAL FIELD OF THE INVENTION

This invention relates generally to spherical bearings and more particularly to dual load path spherical bearings and dual load path rod end bearings.

BACKGROUND OF THE INVENTION

A primary concern of designers of aircraft and other public transportation vehicles is safety. Of particular concern are components with the capacity for catastrophic failure. In fact, Federal Air Regulations Part 23.1309 and Part 25.1309 require that the occurrence of any failure condition which would prevent the continued safe flight and landing of an airplane is extremely improbable.

Current spherical and rod end bearing designs are susceptible to single point failures in: the antifriction feature, the bearing ball (uni-ball), and the bearing race. Rod end bearings are additionally susceptible to single point failures in the bearing coupling shaft and the threads of the bearing coupling shaft. Current attempts to conform spherical and rod end bearing designs to acceptable safety standards including the aforementioned Federal Regulations include using multiple components to perform the same function thus allowing one component to fail without failing the entire system. Although this duality of devices meets acceptable safety requirements including Federal Regulations, it greatly increases the cost and weight of current rod end bearing designs. In addition, components designed in this way are bulky and require a great deal of space to be mounted within the aircraft.

Therefore, a need has arisen for a method and apparatus for a dual load path rod end bearing and a dual load path spherical bearing that overcomes the disadvantages and deficiencies of the prior art.

SUMMARY OF THE INVENTION

An apparatus for a dual load path spherical rod end bearing comprises a bearing race and a bearing ball. The bearing race comprises a bearing race first half and a bearing race second half adapted to interface with the bearing race first half to form a bearing ball cage. The bearing ball is rotatably caged in the bearing ball cage. The bearing ball comprises a bearing ball first half, and a bearing ball second half adapted to interface with the bearing ball first half.

An apparatus for a dual load path spherical rod end bearing comprises a bearing race and a bearing ball. The bearing race comprises a bearing race first half having an internally and externally threaded half coupling shaft, and a bearing race second half adapted to interface with the bearing race first half to form a bearing ball cage and having an internally and externally threaded half coupling shaft. The bearing ball is rotatably caged in the bearing ball cage. The bearing ball comprises a bearing ball first half, and a bearing ball second half adapted to interface with the bearing ball first half.

In another embodiment of the present invention, a dual load path spherical rod end bearing comprises a bearing race, a bearing ball, a collar and a coupling shaft. The bearing race comprises a bearing race first half comprising: a first end plate, at least one projection extending from the first end plate, and an internally and externally threaded half coupling shaft; and a bearing race second half adapted to interface with the bearing race first half to form a bearing ball cage and comprising: a second end plate, at least one projection extending from the second end plate to interface with at least one projection extending from the first end plate, and an internally and externally threaded half coupling shaft. A bearing ball is rotatably caged in the bearing ball cage. The bearing ball comprises a bearing ball first half, and a bearing ball second half adapted to interface with the bearing ball first half. A collar having internal threads receives the external threads of the coupling shaft, and an inner shaft of the collar receives the internal threads of the coupling shaft.

A technical advantage of the present invention is that both the dual load path spherical bearing and the dual load path bearing race incorporate a bearing ball split into two cooperating halves and a bearing race split into two cooperating halves. The advantage of the invention is that the bearing ball first half may transmit a force integral with or independent from the bearing ball second half. This redundancy feature minimizes catastrophic failure of the assembly if either the bearing ball first half or the bearing ball second half fails. Similarly, the bearing race first half may transmit a force integral with or independent from the bearing race second half, thus preventing catastrophic failure of the assembly if either the bearing race first half or the bearing race second half fails. In addition, the rod end bearing of the present invention maintains a load path if only one bearing ball half and one bearing race half are mated.

The dual load path spherical rod end bearing contains further technical advantages. The dual load path spherical rod end bearing comprises a coupling shaft split into two cooperating halves. These coupling shaft halves are threaded as a conventional rod end bearing, but are additionally threaded on the inner bore of each half shaft. This allows for the attachment of a dual load path "shaft in shaft" design. That is, the bearing coupling shaft operates to receive an outer collar coupled to the outside diameter of the bearing coupling shaft, and an inner shaft coupled to the inner bore of the bearing coupling shaft. These components may transmit a force integral with or independent from each other such that if either the collar or the inner shaft fails, a load path is maintained through the non-failed component. In addition, in one particular embodiment of the present invention, each bearing ball half has an independent bushing such that if either bearing ball half or bushing fails, a load path is maintained through the non-failed bearing ball half and bushing.

Another technical advantage of the present invention is that both the dual load path spherical bearing ball and the dual load path bearing race comply with acceptable safety regulations, while reducing the associated cost, weight and bulk of previous complying spherical rod end bearings.

BRIEF DESCRIPTION OF THE DRAWINGS

For a more complete understanding of the present invention and the advantages thereof, reference is now made to the following descriptions taken in connection with the accompanying drawings:

FIG. 1 illustrates an exemplary assembly of a dual load path spherical rod end bearing;

FIG. 2 is a front view of the bearing race first half of the spherical bearing of FIG. 1;

FIG. 3 is a side view of the bearing race first half of the spherical bearing of FIG. 1;

FIG. 4 illustrates a split bearing ball of the spherical bearing of FIG. 1;

FIG. 5 illustrates a side view of the bearing race second half of the spherical bearing of FIG. 1;

FIG. 10 illustrates a side view of an exemplary assembly of a dual load path spherical rod end bearing;

FIG. 11 is a front view of an exemplary dual load path rod end bearing having external threads on the outer diameter of the rod end coupling shaft;

FIG. 12 is a view taken along the line A—A of FIG. 11, showing the bottom view of the dual load path rod end bearing of FIG. 10 having external threads on the outside diameter of the rod end coupling shaft and internal threads on an inner bore of the rod end coupling shaft;

FIG. 13 is a sectional view taken along the line 13—13 of FIG. 12, showing a side view of the dual load path rod end bearing of FIG. 10 having internal threads on an inner bore of the rod end coupling shaft;

FIG. 18 is a front view of the bearing race second half of the rod end bearing of FIG. 10; and FIG. 19 illustrates an assembly of a dual load path spherical rod end bearing with a shaft-in-shaft collar.

DETAILED DESCRIPTION OF THE INVENTION

Figure 7:
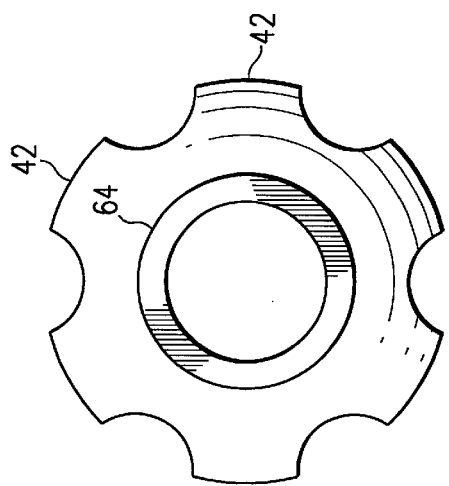
FIG. 7 illustrates a front view of bearing ball of the spherical bearing of FIG. 1.

The preferred embodiment of the present invention and its advantages are best understood by referring to FIGS. 1 through 19 of the drawings, like numerals being used for like and corresponding parts of the various drawings.

FIGS. 1 though 9 illustrate a dual load path spherical bearing 10 comprising a bearing race 12 and a bearing ball 14. Bearing race 12 comprises a bearing race first half 16 (FIGS. 2, 3)and a bearing race second half 22 (FIGS. 5, 6) adapted to interface with bearing race first half 16 to form a bearing ball cage. Rotatably caged in the bearing ball cage is the bearing ball 14. The bearing ball 14 comprises a bearing ball first half 30, and a bearing ball second half 32 (FIG. 4) adapted to interface with bearing ball first half.

Included as a part of the bearing race first half 16 is a first end plate 34 having a plurality of projections 36 extending therefrom. Similarly, the bearing race second half 22 comprises a second end plate 38 having a plurality of projections 40 to complement projections 36 of first end plate 34. The assembly of the bearing race first half 16 and the bearing second half 22 forms the bearing cage for rotatably supporting the bearing ball 14. Although the preceding discussion refers to a plurality of projections, the present invention contemplates one or more projections 36 interdigitated with one or more projections 40. Bearing race first half 16 further comprises an aperture 66 for receiving a portion of bearing ball first half 30. Similarly, bearing race second half 22 further comprises an aperture 68 for receiving a portion of bearing ball second half 32.

Figure 9:
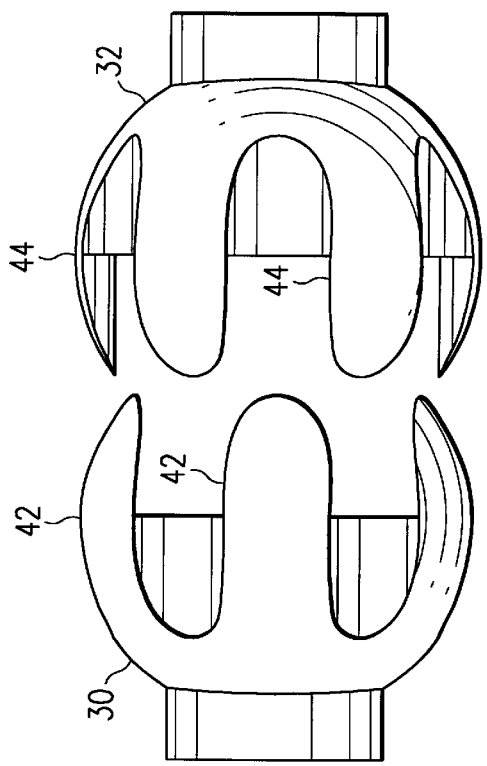
FIG. 9 is an exploded side view of the bearing ball of FIG. 7 and FIG. 8.
Figure 6:
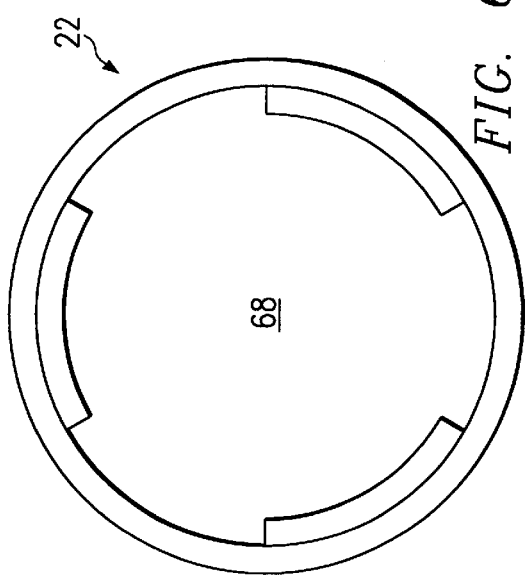
FIG. 6 is a rear view of the bearing race second half of the spherical bearing of FIG. 1.
Figure 8:
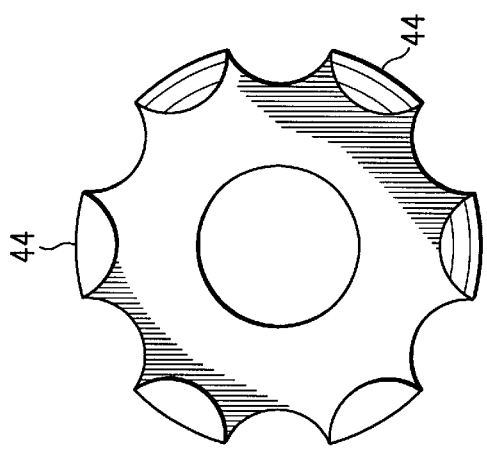
FIG. 8 is a vertical cross sectional view of the bearing ball of FIG. 7.
Figure 17:
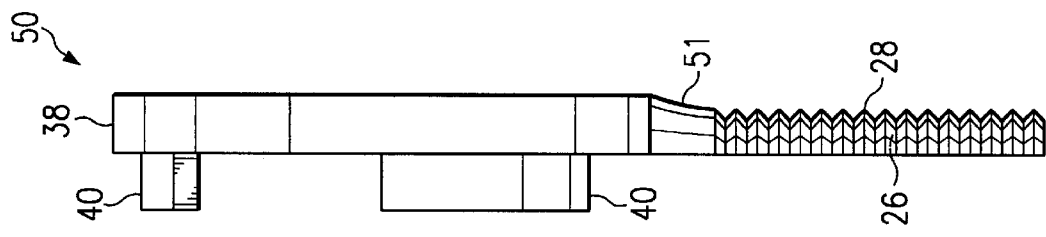
FIG. 17 is a side view of the bearing race second half of the rod end bearing of FIG. 10.
Figure 16:
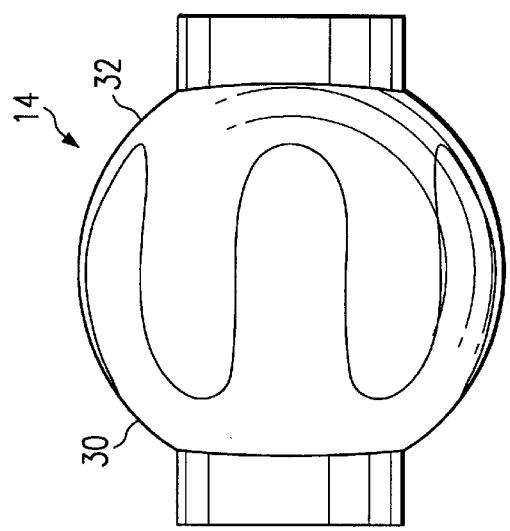
FIG. 16 shows a split bearing ball of the rod end bearing of FIG. 10.
Figure 15:
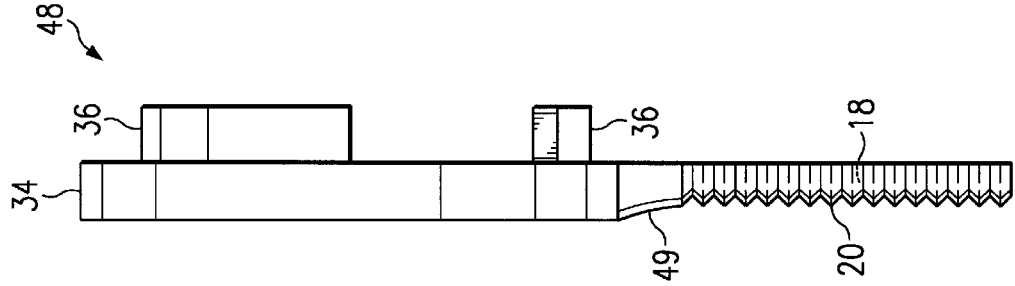
FIG. 15 illustrates a side view of the bearing race first half of the rod end bearing of FIG. 10.
Figure 14:
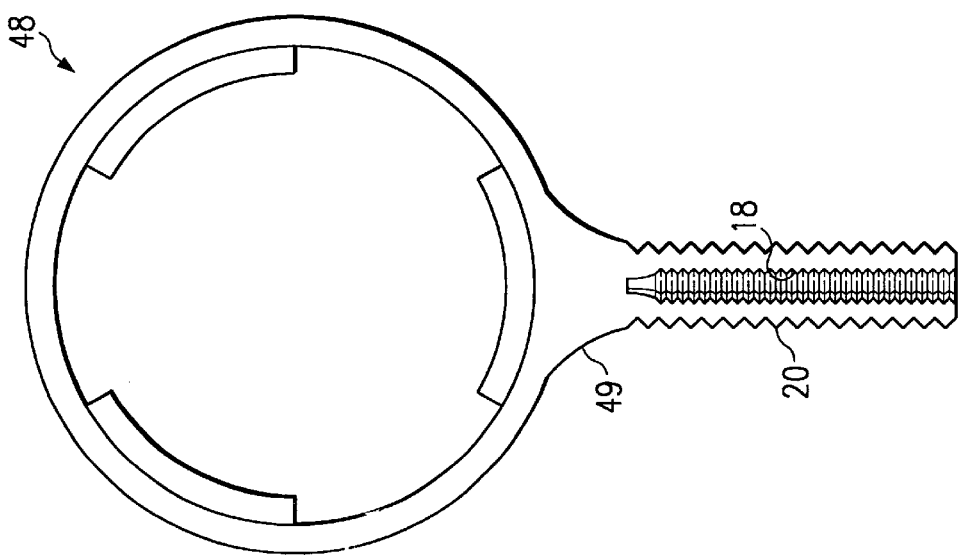
FIG. 14 illustrates a front view of the bearing race first half of the rod end bearing of FIG. 10.

Referring to FIGS. 7, 8 and 9, the bearing ball 14 comprises a plurality of undulations 42 to define an inner surface of the bearing ball first half 30 and a plurality of undulations 44 to define an inner surface of the bearing ball second half 32. The undulations 44 are complementary to undulations 42 and interface on assembly to form the bearing ball 14. Although the preceding discussion refers to a plurality of undulations, the present invention contemplates one or more undulations 42 interfacing one or more undulations 44.

A technical advantage of the present invention is that both the bearing ball 14 and the bearing race 12 are split into two cooperating halves. The advantage of this design is that the bearing ball first half 30 transmits a force integral with or independent from the bearing ball second half 32. This redundancy feature minimizes catastrophic failure of the assembly upon failure of either bearing ball first half 30 or bearing ball second half 32. Similarly, the bearing race first half 16 may transmit a force integral with or independent from bearing race second half 22, thus minimizing catastrophic failure of the assembly upon failure of either bearing race first half 16 or bearing race second half 22. In addition, a bearing in accordance with this invention will functionally transmit a load if only bearing ball first half 30 and bearing race first half 16 are mated or if only bearing ball second half 32 and bearing race second half 22 are mated.

FIGS. 10 through 18 illustrate an alternative embodiment of a dual load path rod end bearing 11. The previous description for the spherical bearing 10 discussed in conjunction with FIGS. 1 through 9 also applies to rod end bearing 11. However, the rod end bearing 11 includes a bearing race 46 that is a variation from bearing race 12 of spherical bearing 10. In the embodiment of FIG. 10 through 18, the bearing race 46 comprises a bearing race first half 48 having a coupling shaft 49 with an internally threaded section 18 (FIG. 12), and an externally threaded section 20 (FIG. 11). Further, the bearing race second half 50 adapted to interface with the bearing race first half 48 includes a coupling shaft 51 with an internally threaded section 26 (FIG. 13) and externally threaded section 28 (FIG. 11). The significance of this difference will be discussed in conjunction with FIG. 19.

Referring to FIG. 19, there is illustrated an exemplary assembly 52 that includes the rod end bearing 11. A collar 54 having an internally threaded passage receives external threads 20 and 28 of the coupling shafts 49 and 51, and an inner externally threaded shaft 56 that receives internal threads 18 and 26 of the coupling shafts 49 and 51. Collar 54 and inner shaft 56 are coupled by a locking pin 58 that prevents rotation of either race half in the event of a failure of one of the opposite threaded race half. An important technical advantage of this embodiment is that the internally threaded passage of the collar 54 transmits the load in the event of a failure to inner shaft 56, and the inner shaft transmits the load in the event of a failure of the internally threaded passage of collar 54.

In addition, the bearing ball 14 of FIG. 19 has an aperture for receiving at least one bushing. In one particular embodiment of the present invention as illustrated in FIG. 19, the bearing ball first half 30 and the bearing ball second half 32 each include a press fit bushing, 60, 62, respectively. Rotatably coupled to the bushing 60 is a clevis 64 as part of the structure coupled to the rod end bearing of the present invention.

Similarly, rotatably coupled to the bushing 62 is a clevis 66. The assembly of the bearing ball 14, bushings 60 and 62, and the clevis 64 and 66 is held in place by a fastener illustrated as a bolt 68 and a nut 70. In the event of a failure of the bolt 68 or the nut 70 the pressed end bushings 60 and 62 function as a second load path. In addition, upon a failure of either bearing ball half 30 or 32, or if either bushing 60 or 62 fails, a load path is established through the non-failed bearing ball half 30 or 32 and bushing 60 or 62.

While the invention has been shown and described by the foregoing detailed description, it will be understood by those skilled in the art that various other changes in form and detail may be made without departing from the spirit and scope of the invention.

I claim:

1. A dual load path spherical bearing, comprising:
   a bearing race comprising:
      a bearing race first half comprising a first end plate having a plurality of projections extending from the first end plate;
      a bearing race second half comprising a second end plate having a plurality of projections extending from the second end plate complementary to the plurality of projections extending from the first end plate and adapted to interface with the bearing race first half to form a bearing ball cage; and
      a bearing ball rotatably caged in the bearing ball cage, said bearing ball comprising:
         a bearing ball first half; and
         a bearing ball second half adapted to interface with the bearing ball first half.

2. The dual load path spherical bearing of claim 1 wherein the bearing ball first half comprises at least one undulation, and the bearing ball second half comprises at least one undulation complementary to the at least one undulation extending from the bearing ball first half.

3. The dual load path spherical bearing of claim 1 wherein the bearing ball further comprises a plurality of undulations extending from the bearing ball first half, and a plurality of undulations extending from the bearing ball second half complementary to the plurality of undulations extending from the bearing ball first half.

4. A dual load path rod end bearing, comprising:
   a bearing race comprising:
      a bearing race first half comprising an internally and externally threaded half coupling shaft;
      a bearing race second half adapted to interface with the bearing race first half to form a bearing ball cage, the bearing race second half comprising an internally and externally threaded half coupling shaft mating with the half coupling shaft of the bearing race first half to form an internally and externally threaded coupling shaft; and
      a bearing ball rotatably caged in the bearing ball cage, said bearing ball comprising:
         a bearing ball first half; and
         a bearing ball second half adapted to interface with the bearing ball first half.

5. The dual load path rod end bearing of claim 4 wherein:
   the bearing race first half comprises:
      a first end plate having at least one projection extending from the first end plate;
   the bearing race second half comprises:
      a second end plate having at least one projection extending from the second end plate to interface with the at least one projection extending from the first end plate.

6. The dual load path rod end bearing of claim 5 wherein the first end plate and the second end plate comprise a plurality of projections extending from the first end plate and a plurality of projections extending from the second end plate complementary to the plurality of projections extending from the first end plate.

7. The dual load path rod end bearing of claim 4 further comprising a collar receiving the external threads of the coupling shaft and an inner shaft receiving the internal threads of the coupling shaft.

8. The dual load path rod end bearing of claim 4 wherein the bearing ball further comprises the at least one bushing and an aperture for receiving the at least one bushing.

9. The dual load path rod end bearing of claim 4 wherein the bearing ball first half comprises at least one undulation, and the bearing ball second half comprises at least one undulation complementary to the undulation extending from the bearing ball second half.

10. The dual load path rod end bearing of claim 4 wherein the bearing ball further comprises a plurality of undulations extending from the bearing ball first half, and a plurality of undulations extending from the bearing ball second half complementary to the plurality of undulations extending from the bearing ball second half.

11. A dual load path rod end bearing, comprising:
    a bearing race comprising:
       a bearing race first half having a first end plate, at least one projection extending from the first end plate, and an internally and externally threaded half coupling shaft; and a bearing race second half adapted to interface with the bearing race first half to form a bearing ball cage, the bearing race second half having a second end plate, at least one projection extending from the second end plate to interface with at least one projection extending from the first end plate, and an internally and externally threaded half coupling shaft to mate with the half coupling shaft of the bearing race first half to form a coupling shaft;
    a bearing ball rotatably caged in the bearing ball cage, said bearing ball comprising:
       a bearing ball first half; and
       a bearing ball second half adapted to interface with the bearing ball first half; and
       a collar having internal threads receiving the external threads of the coupling shaft and an inner shaft receiving the internal threads of the coupling shaft.

12. The dual load path rod end bearing of claim 11 wherein the bearing ball further comprises an aperture for receiving at least one bushing.

13. The dual load path rod end bearing of claim 11 wherein the first end plate and the second end plate comprise an opening to the bearing ball.

14. The dual load path rod end bearing of claim 11 wherein the bearing ball first half comprises at least one undulation, and the bearing ball second half comprises at least one undulation complementary to the undulation extending from the bearing ball first half.

15. The dual load path rod end bearing of claim 11 further comprising a plurality of undulations extending from the bearing ball first half, and a plurality of undulations extending from the bearing ball second half complementary to the plurality of undulations extending from the bearing ball first half.

16. A dual load path spherical bearing, comprising:
    a bearing race comprising a bearing ball cage;
    a bearing ball rotatably caged in the bearing ball cage, said bearing ball comprising:

a bearing ball first half comprising at least one undulation; and a bearing ball second half comprising at least one undulation complementary to the at least one undulation of the bearing ball first half and adapted to interface with the bearing ball first half.

17. The dual load path spherical bearing of claim 16 wherein the bearing race further comprises a first end plate, and at least one projection extending from the first end plate, and a second end plate, and at least one projection extending from the second end plate to interface with the at least one projection extending from the first end plate to form the bearing ball cage.

18. The dual load path spherical bearing of claim 17 wherein the first end plate and the second end plate comprise a plurality of projections extending from the first end plate and a plurality of projections extending from the second end plate complementary to the plurality of projections extending from the first end plate.

19. The dual load path spherical bearing of claim 16 wherein the bearing ball further comprises an aperture for receiving at least one bushing.

20. The dual load path spherical bearing of claim 16 wherein the bearing race further comprises:

a bearing race first half comprising an internally and externally threaded half coupling shaft; and a bearing race second half adapted to interface with the bearing race first half to form the bearing ball cage, the bearing race second half comprising an internally and externally threaded half coupling shaft mating with the half coupling shaft of the bearing race first half to form an internally and externally threaded coupling shaft.

21. A dual load path spherical bearing, comprising:

a bearing race comprising a bearing ball cage;

a bearing ball rotatably caged in the bearing ball cage, said bearing ball comprising:

a bearing ball first half comprising a plurality of undulations extending from the bearing ball first half; and a bearing ball second half comprising a plurality of undulations extending from the bearing ball second half complementary to the plurality of undulations extending from the bearing ball first half and adapted to interface with the bearing ball first half.

22. The dual load path spherical bearing of claim 21 wherein the bearing race further comprises:

a bearing race first half comprising an internally and externally threaded half coupling shaft; and a bearing race second half adapted to interface with the bearing race first half to form the bearing ball cage, the bearing race second half comprising an internally and externally threaded half coupling shaft mating with the half coupling shaft of the bearing race first half to form an internally and externally threaded coupling shaft.

23. The dual load path spherical bearing of claim 22 wherein:

the bearing race first half comprises:

a first end plate having at least one projection extending from the first end plate; and the bearing race second half comprises:

a second end plate having at least one projection extending from the second end plate to interface with the at least one projection extending from the first end plate.

* * * * *